(12) United States Patent
Marcus

(10) Patent No.: US 9,177,552 B2
(45) Date of Patent: Nov. 3, 2015

(54) METHOD AND APPARATUS FOR SETTING SELECTED RECOGNITION PARAMETERS TO MINIMIZE AN APPLICATION COST FUNCTION

(75) Inventor: Jeffrey N. Marcus, Newton, MA (US)

(73) Assignee: Nuance Communications, Inc., Burlington, MA (US)

( * ) Notice: Subject to any disclaimer, the term of this patent is extended or adjusted under 35 U.S.C. 154(b) by 425 days.

(21) Appl. No.: 13/365,587

(22) Filed: Feb. 3, 2012

(65) Prior Publication Data
US 2013/0204626 A1    Aug. 8, 2013

(51) Int. Cl.
*G10L 21/00* (2013.01)
*G10L 15/22* (2006.01)
*G10L 15/18* (2013.01)

(52) U.S. Cl.
CPC .............. *G10L 15/22* (2013.01); *G10L 15/1822* (2013.01); *G10L 2015/227* (2013.01)

(58) Field of Classification Search
CPC ....................................................... G10L 15/22
USPC ............................................. 704/270, 270.1
See application file for complete search history.

(56) References Cited

U.S. PATENT DOCUMENTS

| 6,438,519 | B1 * | 8/2002 | Campbell et al. | 704/243 |
| 7,657,433 | B1 * | 2/2010 | Chang | 704/252 |
| 8,209,174 | B2 * | 6/2012 | Al-Telmissani | 704/246 |
| 2005/0065793 | A1 * | 3/2005 | Choi et al. | 704/240 |
| 2014/0156275 | A1 * | 6/2014 | Gorin et al. | 704/244 |

OTHER PUBLICATIONS

Williams, Jason D., "Partially Observable Markov Decision Processes for Spoken Dialogue Management," *The Doctoral Thesis* (2006), 138 pages.
Williams, J., et al, "Partially Observable Markov Decision Processes for Spoken Dialog Systems," *Computer Speech and Language* (2007), pp. 393-422.
Williams, J., et al, "Partially Observable Markov Decision Processes With Continuous Observations for Dialogue Management," *Recent Trends in Discourse and Dialogue* (2008), pp. 191-217.

* cited by examiner

*Primary Examiner* — Jakieda Jackson
(74) *Attorney, Agent, or Firm* — Hamilton, Brook, Smith & Reynolds, P.C.

(57) ABSTRACT

Methods and systems for setting selected automatic speech recognition parameters are described. A data set associated with operation of a speech recognition application is defined and includes: i. recognition states characterizing the semantic progression of a user interaction with the speech recognition application, and ii. recognition outcomes associated with each recognition state. For a selected user interaction with the speech recognition application, an application cost function is defined that characterizes an estimated cost of the user interaction for each recognition outcome. For one or more system performance parameters indirectly related to the user interaction, the parameters are set to values which optimize the cost of the user interaction over the recognition states.

16 Claims, 2 Drawing Sheets

1

METHOD AND APPARATUS FOR SETTING SELECTED RECOGNITION PARAMETERS TO MINIMIZE AN APPLICATION COST FUNCTION

TECHNICAL FIELD

The present invention relates to operation of automatic speech recognition systems.

BACKGROUND ART

A telephone-based speech recognition application such as a spoken dialog system can be modeled as a sequence of recognition states. At each state, a prompt is played, the caller responds to it and his voice response is sent to the recognizer. The recognized utterance is returned with a confidence value reflecting the confidence the system has that the utterance was assigned to the correct class. Depending on the confidence value, the system may take one of several actions, based on thresholds set by a speech recognition engineer.

Often there are two confidence score thresholds, a low-confidence threshold (LCT) and a high-confidence threshold (HCT), which divide confidence scores into three Regions— reject, confirm, accept:

If the confidence score is below the LCT, it is rejected and typically the caller is asked to repeat his answer to the prompt.

If the confidence score is between LCT and HCT, the caller is asked to confirm his response, i.e. "Did you say your number was 1234?"

If the confidence score is above the HCT, the utterance is accepted, and the dialog continues to the next state, assuming the recognizer was correct.

Depending on how the confidence score thresholds are set, the following recognition outcomes can occur:

Correct acceptance (CA): the utterance was recognized correctly and accepted. This is generally considered the best outcome.

False acceptance (FA): the utterance was recognized incorrectly and accepted. This is generally the worst outcome.

Correct confirmation (CC): the utterance was recognized correctly and caller was asked to confirm. He will typically say "yes" and the call will continue.

False confirmation (FC): the utterance was interpreted incorrectly and caller was asked to confirm. He will typically say "no" and will be asked to repeat his original response.

Rejection (R): The utterance as rejected and typically the caller will be asked to repeat his original. One can further divide rejection into "correct' and "false" rejection, depending on whether or not rejection was the best action to take.

The correctness of the recognition in determining which of the above outcomes occurred is determined by comparing the annotation of a human transcriber with the recognizer output, with some allowance for "filler words." For example, if the caller says account balances or account balances, please and the recognizer returns account balances, this is deemed correct. FIG. 1 shows the relationship between recognition correctness, the confidence score thresholds, and the various recognition outcomes. Varying the thresholds will vary the relative occurrence of the five different outcomes. As the LCT is increased, there are more rejections and fewer confirmations, while as the HCT is increased, there are more confirmations and fewer acceptances. However, without an underlying idea of what makes the "best" application, it is unclear how to best set these thresholds to an optimal distribution of the various recognition outcomes.

SUMMARY

Embodiments of the present invention are directed to a computer-implemented method employing at least one hardware implemented computer processor for setting automatic speech recognition parameters. A data set that is associated with operation of a speech recognition application such as a spoken dialog system is defined in a computer process. The data set includes recognition states that characterize the progression of a user through the speech recognition application, and recognition outcomes that are associated with each recognition state. An application cost function characterizes for a selected user interaction with the speech recognition application an estimated cost of the user interaction for each recognition outcome. One or more system performance parameters that are indirectly related to the user interaction are set to values which optimize the cost of the user interaction over the recognition states.

A cost optimization interval may define a set of subsequent recognition states for each recognition outcome for which the cost of the user interaction is optimized. The estimated cost may be based on actual user interaction cost data for each recognition outcome and/or an estimate pooling approach. The cost may be optimized based on a distribution of recognition outcome probabilities to maximize a sum of the products of the recognition outcome products and the probability value estimate. In addition or alternatively, the cost may be optimized based on a joint state optimization approach.

The selected user interaction may be user specified. The system performance parameters may include one or more speech recognition confidence score thresholds directly related to the recognition outcomes and/or one or more speech detection thresholds.

Embodiments also include a speech recognition application implemented as one or more computer processes functioning in a computer processor and using a method according to any of the above. Embodiments also include a computer program product for speech recognition implemented in a tangible computer readable storage medium which includes program code for performing a method according to any of the above.

DETAILED DESCRIPTION

Figure 1:
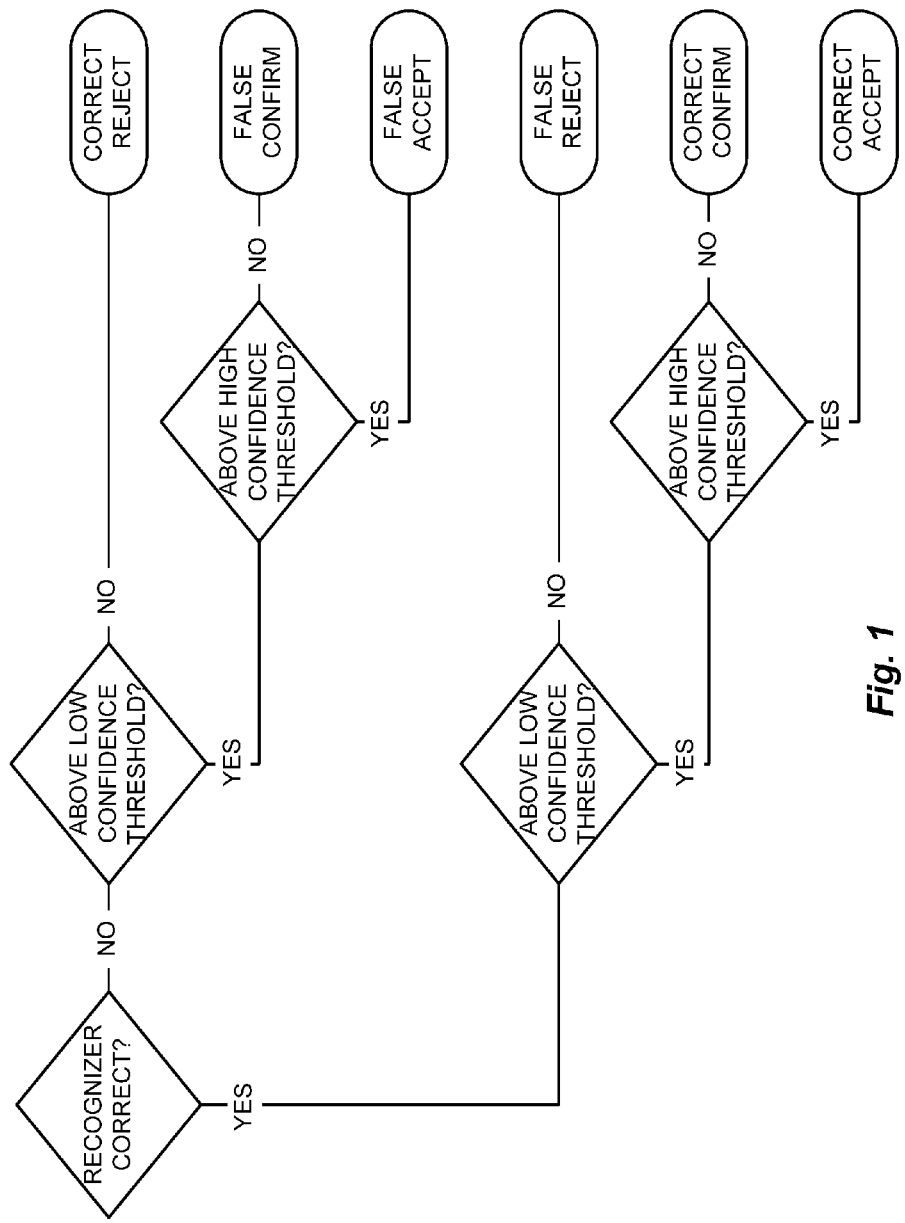
FIG. 1 shows the relationship between recognition correctness, the confidence score thresholds, and the various recognition outcomes.
Figure 2:
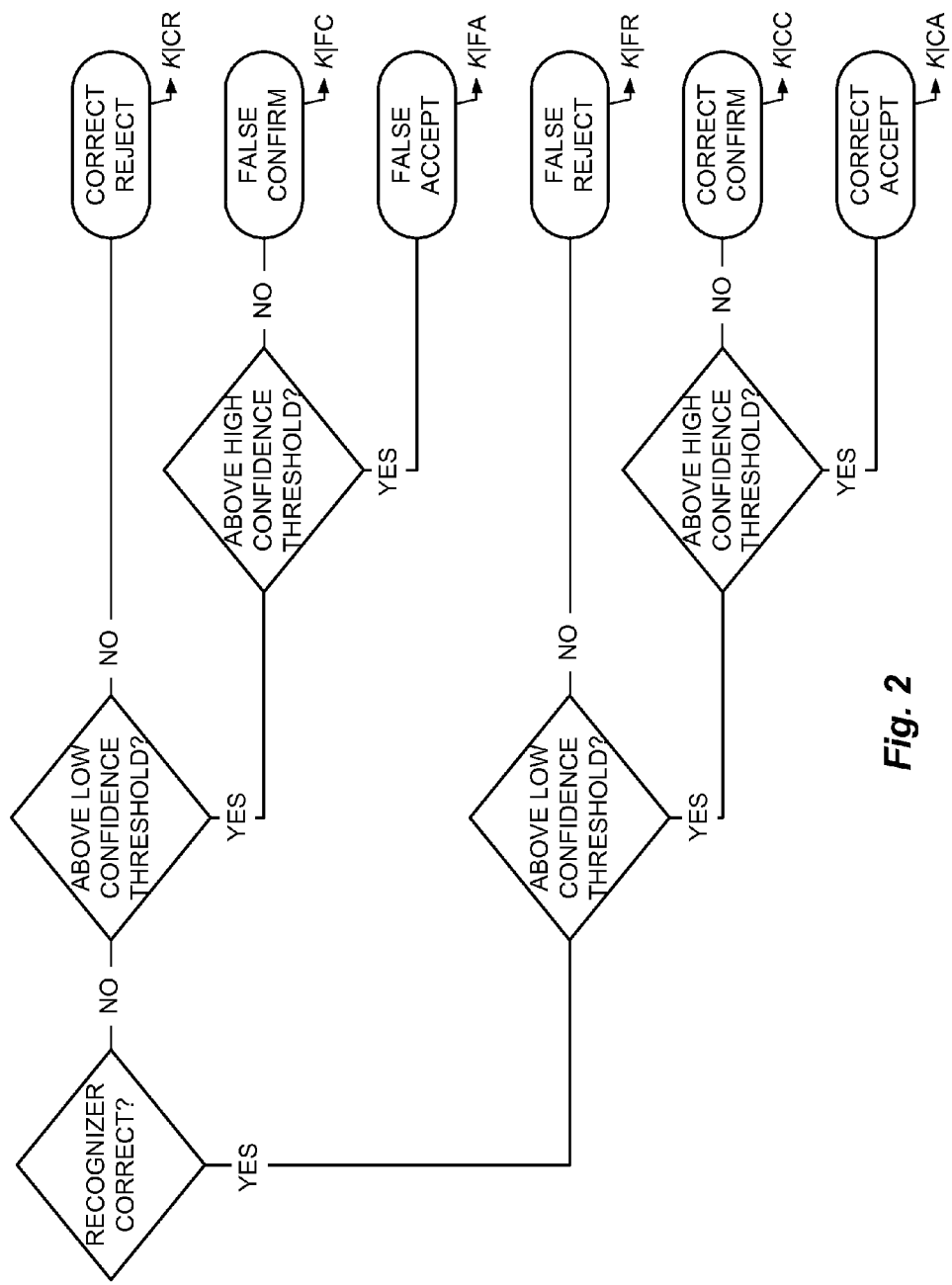
FIG. 2 shows the addition to FIG. 1 of an application cost function for each recognition outcome.

Embodiments of the present invention are directed to setting automatic speech recognition parameters to optimize system performance in a deployed speech recognition application such as an interactive dialog system. A data set is defined which includes recognition states that characterize the semantic progression of a user interaction with the speech recognition application, and recognition outcomes associated with each recognition state. For a selected user interaction with the speech recognition application, an application cost function is used to characterize an estimated cost of that user interaction for each possible recognition outcome, where the estimated cost is a numerical value characterizing one or more aspects of the system operation. Then one or more system performance parameters indirectly related to the user interaction are set to values which optimize the cost of the user interaction over the recognition states.

More specifically, for each target recognition state in the application to be optimized, an application cost function (ACF) is defined for optimizing. The function may be simple, such as a total number of callers who are transferred to a human agent, or composite, such as a weighted sum of call duration, number of callers who hang up before completing a task, and number of callers transferred to an agent. In general, the ACF will depend on the behavior of callers as observed in a deployed application. Then for the ACF, a cost optimization interval (COI) is defined for a set of recognition states subsequent to the target state over which the ACF will be optimized. The COI would typically be selected to be an interval over which the recognition outcome would have significant influence on the application cost. It could be as small as the single state following the target or as large as the remainder of states till the phone call ends. Alternatively, the speech application can be modeled as a set of tasks each consisting of one or more states. The COI can then be defined as the set of states after the target state up to and including the end of the task that contains the target.

One specific example of such an optimization algorithm works as follows. First a set of utterances is collected from a speech application that is already in operation (i.e., has had real callers using it). In particular for each target state and each phone call, the algorithm collects the recognition outcome (one of CA, FA, CC, FC, R) and the application cost for that call measured over the cost optimization interval, where the estimated cost is a numerical value characterizing one or more aspects of the system operation. For example, if the cost function is the number of times the call is transferred to a human agent, then optimizing the cost would mean minimizing the average number of such transfers. Depending on the specific cost involved, optimizing may mean minimizing, maximizing, etc. Here for the number of times the call is transferred to a human agent, the optimization algorithm collects outcome/cost pairs:

CA, 0
FA, 1
CC, 1 etc. where the first column is outcome and second column is 1 if there was a transfer to a human agent, or 0 otherwise. Note that human annotation is needed to determine the recognition outcome. Then the estimated average costs associated with each outcome are calculated. For example, let the average cost of an FA be AveCost(FA), etc. If there were 100 FA's and their total cost was 45, then the average cost is 0.45 per FA.

Application-cost-minimizing thresholds (ACMT) can be calculated by estimating the effect of different choices of LCT and HCT by varying each over a "grid" of values. For instance, the low-confidence threshold could be varied from 0 to 1000 (on a scale of 0-1000) by steps of 10 (0, 10, 20, . . . , 1000), and the HCT from the LCT to 1000, also by steps of 10. Each LCT-HCT pair will lead to a different distribution of recognition outcomes and hence a different application cost. Mathematically, this can be represented as:

$$\text{PredCost}(LCT,HCT)=1/N\{|CA(LCT,HCT)|*\text{AveCost}(CA)+|FA(LCT,HCT)|*\text{AveCost}(FA)+\ldots+|R(LCT,HCT)|*\text{AveCost}(R)$$

where PredCost(LCT, HCT) is the predicted cost for a given (LCT, HCT) pair, N is the number of utterances that were collected, |CA(LCT, HCT)| is the number of CA's that would occur for a given LCT, HCT pair, etc. The (LCT, HCT) pair minimizing PredCost is selected as the ACMT. If the predicted cost is lower than the cost measured with the thresholds in the deployed application, then the application cost can be reduced by replacing the current thresholds with the ACMT, presumably delivering a better application, at least in terms of application cost.

For a given target state, the estimated costs for each outcome can be computed by combining estimates based on data from both the target state, other states in the application and even states in other applications. This pooling of estimated states can help improve estimates especially when the target state has little data. Known methods for pooling estimates such as Empirical Bayes can be used for this.

Such processing would also be compatible with finer-grained recognition outcome definitions, and so could be applied to more or different recognition outcomes than the five described above. For instance, costs might be dependent on both whether or not the caller spoke out-of-grammar, and on the outcome. The same approach could be used to minimize predicted cost in this case as well.

The foregoing discussion is set forth in terms of cost-minimization for a single state. Using known optimization algorithms it also would be possible to optimize many states in the application at once. This joint-state optimization might be useful if it were determined that application cost depended not just on outcomes at each state, but on interactions among outcomes at different states (e.g., if two rejections in a row were associated with a much higher cost than that estimated for a rejection on each state alone.)

As described above, the field engineer can define any cost function that can be measured for each call, not just simple ones such as number of agent transfers. And so the cost functions may usefully and more generally be user-specified.

Embodiments of the present invention can be used to optimize other behavior-affecting parameters besides confidence thresholds, for instance, speech detection thresholds, which if set high, require the caller to speak loudly to be "heard" by the recognizer, and if set low will allow non-speech noises to trigger the recognizer, generally leading to a spurious response by the application.

There currently are a number of commercially available tools and services designed to analyze speech recognizer accuracy and caller behavior within a deployed application. For example the Nuance Enterprise product family includes On-Demand Insight (ODI), Nuance Application Reporting (NAR), Nuance-Tune, and Nuance Voice Insight (NVI). These tools have strong analytic capabilities, but need input from skilled personnel to develop actionable recommendations. Embodiments of the present invention can be integrated into such a tool suite, thereby increasing the suite's value and guiding users into setting recognizer parameters to optimize application performance.

The calculations used to implement the methods described herein use tools and apparatus such as the following, all of which typically are delivered with commercial development products such as the Nuance Enterprise product family:

1. Logging of whether the application accepted, confirmed, or rejected each utterance. This can be done, for example, by Nuance Dialog Modules.
2. Logging of information required to compute the cost, such as whether caller transferred to an agent or hung up, the duration they took to accomplish steps within a call, or whether a task was deemed successful or not. Agent transfers, hang ups, and duration can be computed from the logging of the Nuance Dialog Modules and other components. Task success can be computed aided by Nuance Application Reporting After The Fact task outcome definition.

3. Annotation of whether or not each utterance is correct or out-of-grammar, which is accomplished through a combination of the Nuance Application Reporting transcription tool and Nuance Tune.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method employing at least one hardware implemented computer processor for setting selected automatic speech recognition parameters, the method comprising:
by the at least one hardware implemented computer processor:
defining a data set associated with operation of a speech recognition application, the data set including:
i) a plurality of recognition states characterizing semantic progression of a user through the speech recognition application, and
ii) a plurality of recognition outcomes associated with each recognition state;
defining an application cost function characterizing for a selected user interaction with the speech recognition application an estimated cost of the user interaction for each recognition outcome; and
setting one or more system performance parameters indirectly related to the user interaction to values that optimize the cost of the user interaction over the plurality of recognition states, wherein the one or more system performance parameters include at least one of: one or more speech recognition confidence score thresholds directly related to the recognition outcomes and one or more speech detection thresholds.

2. A method according to claim 1, further comprising:
selecting a cost optimization interval defining a set of subsequent recognition states for each recognition outcome for which the cost of the user interaction is optimized.

3. A method according to claim 1, wherein the estimated cost is based on actual user interaction cost data for each recognition outcome.

4. A method according to claim 1, wherein the estimated cost is based on an estimate pooling approach.

5. A method according to claim 1, wherein the cost is optimized based on a distribution of recognition outcome probabilities to maximize a sum of the products of the recognition outcome products and the probability value estimate.

6. A method according to claim 1, wherein the cost is optimized based on a joint state optimization approach.

7. A method according to claim 1, wherein the selected user interaction is user specified.

8. A method according to claim 1, wherein the speech recognition application is a spoken dialog system.

9. A computer program product encoded in a non-transitory computer-readable medium for setting selected automatic speech recognition parameters, the product comprising:
program code for defining a data set associated with operation of a speech recognition application, the data set including:
i) a plurality of recognition states characterizing semantic progression of a user through the speech recognition application, and
ii) a plurality of recognition outcomes associated with each recognition state;
program code for defining an application cost function characterizing for a selected user interaction with the speech recognition application an estimated cost of the user interaction for each recognition outcome; and
program code for setting one or more system performance parameters indirectly related to the user interaction to values which optimize the cost of the user interaction over the plurality of recognition states, wherein the one or more system performance parameters include at least one of: one or more speech recognition confidence score thresholds directly related to the recognition outcomes and one or more speech detection thresholds.

10. A product according to claim 9, further comprising:
program code for selecting a cost optimization interval defining a set of subsequent recognition states for each recognition outcome for which the cost of the user interaction is optimized.

11. A product according to claim 9, wherein the estimated cost is based on actual user interaction cost data for each recognition outcome.

12. A product according to claim 9, wherein the estimated cost is based on an estimate pooling approach.

13. A product according to claim 9, wherein the cost is optimized based on a distribution of recognition outcome probabilities to maximize a sum of the products of the recognition outcome products and the probability value estimate.

14. A product according to claim 9, wherein the cost is optimized based on a joint state optimization approach.

15. A product according to claim 9, wherein the selected user interaction is user specified.

16. A product according to claim 9, wherein the speech recognition application is a spoken dialog system.

\* \* \* \* \*